(12) United States Patent
Toda

(10) Patent No.: US 7,114,263 B2
(45) Date of Patent: *Oct. 3, 2006

(54) GYROCOMPASS

(75) Inventor: Takashi Toda, Kanagawa (JP)

(73) Assignees: Yokogawa Electric Corporation, Tokyo (JP); Yokogawa Densikiki Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/069,812

(22) Filed: Feb. 28, 2005

(65) Prior Publication Data

US 2005/0193578 A1     Sep. 8, 2005

(30) Foreign Application Priority Data

Mar. 3, 2004   (JP)   ............................ P.2004-058391

(51) Int. Cl.
*G01C 19/38*   (2006.01)
(52) U.S. Cl. ..................... 33/327; 33/324; 74/5 R; 74/5.6 C
(58) Field of Classification Search ............ 33/324, 33/327, 316, 317 R, 318–319, 237; 74/5 R, 74/5.1, 5.22, 5.4, 5.34, 5.8, 5.6 R, 5.6 C, 74/5.6 D, 5.6 E, 5.9
See application file for complete search history.

(56) References Cited

U.S. PATENT DOCUMENTS

| | | | | |
|---|---|---|---|---|
| 3,386,179 A | * | 6/1968 | Thomaier et al. ............. | 33/327 |
| 4,471,665 A | * | 9/1984 | Hojo et al. .................... | 74/5.9 |
| 4,517,750 A | * | 5/1985 | Netzer .......................... | 33/327 |
| 6,131,297 A | * | 10/2000 | Yamamoto et al. ........... | 33/326 |
| 6,453,570 B1 | * | 9/2002 | Rahn ............................. | 33/327 |
| 2005/0193579 A1 | * | 9/2005 | Kogure ......................... | 33/327 |

OTHER PUBLICATIONS

Torao Mozai et al., (1971) "konpasu to jairo no riron to jissai (Theory and practice of compass and gyro)", published by Kaibundou Shuppan Kabushiki Kaisha with concise English explanation.

* cited by examiner

*Primary Examiner*—Yaritza Guadalupe-McCall
(74) *Attorney, Agent, or Firm*—Sughrue Mion, PLLC

(57) ABSTRACT

A gyrocompass has a liquid tank containing a supporting liquid therein, a gyrosphere floating in the liquid tank by the supporting liquid and whose central portion is rotatably supported by a center pin provided in an upper portion of the liquid tank, a gyro rotor incorporated in the gyrosphere, two dish-shaped electrodes disposed at a lower portion of the liquid tank and a lower portion of the gyrosphere, and opposed through the supporting liquid, and a pair of follow-up electrodes disposed in a vicinity of a equator of the liquid tank and opposed to be apart by 180°, and two belt-shaped electrodes disposed in vicinities of equators of the liquid tank and the gyrosphere in a state that the follow-up electrodes are located therebetween, and opposed through the supporting liquid, wherein electricity is fed to the gyro rotor through the dish-shaped electrodes and the belt-shaped electrodes.

6 Claims, 6 Drawing Sheets

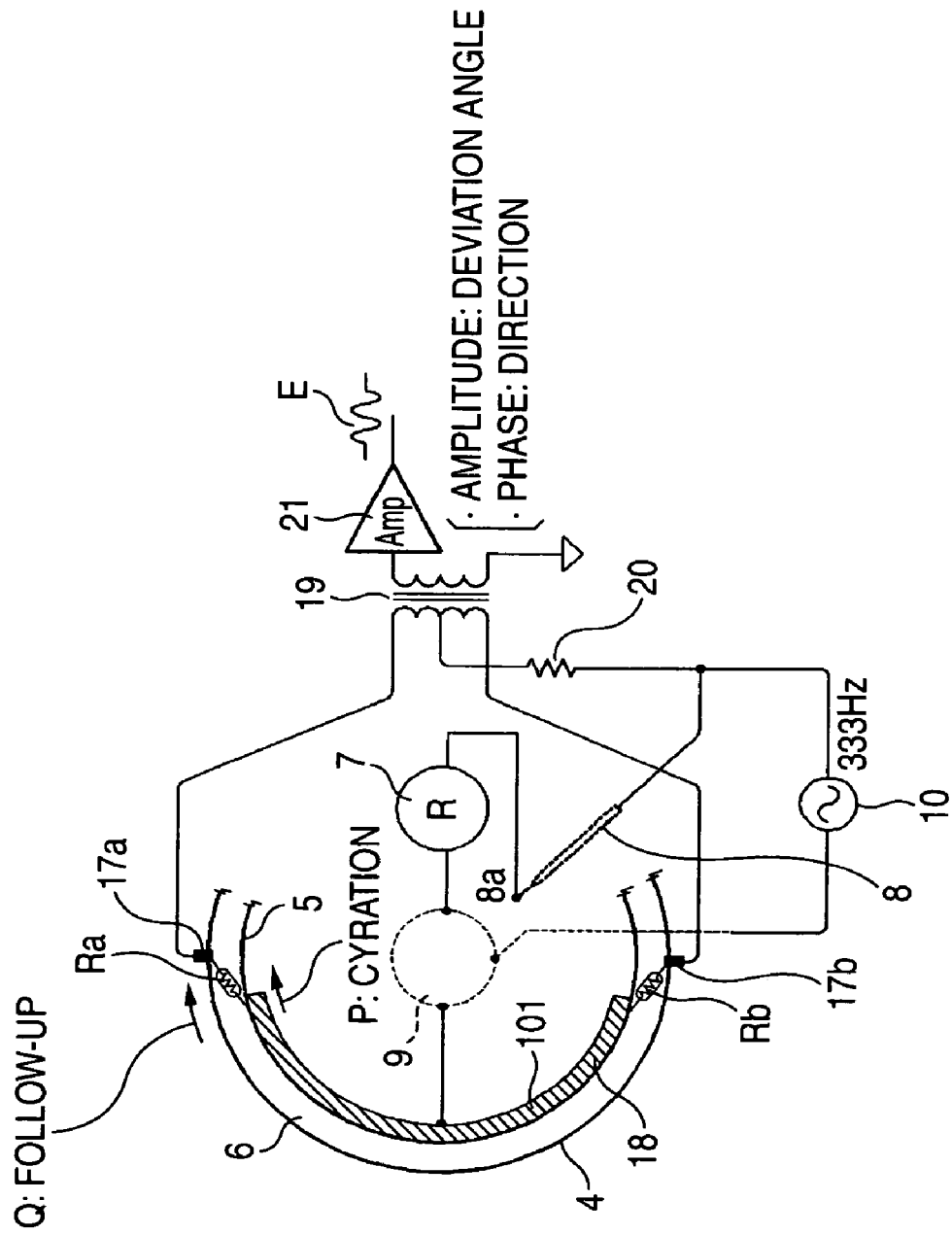

GYROCOMPASS

CROSS-REFERENCE TO RELATED APPLICATIONS

This application is based upon and claims the benefit of priority from the prior Japanese Patent Applications No. 2004-058391, filed on Mar. 3, 2004, the entire contents of which are incorporated herein by reference.

BACKGROUND OF THE INVENTION

1. Field of the Invention

The present invention relates to a feeding structure for a gyro rotor in a gyrocompass which includes a liquid tank containing a supporting liquid therein, a gyrosphere which floats in the liquid tank by means of a supporting liquid and whose central portion is rotatably supported by a center pin provided in an upper portion of the liquid tank, and a gyro rotor incorporated in the gyrosphere.

2. Description of the Related Art

The following publication is known as a document relating to the gyrocompass having a center pin.

"konpasu to jairo no riron to jissai (Theory and practice of compass and gyro)" published on Oct. 1, 1971 by Kaibundou Shuppan Kabushiki Kaisha; Authors: Torao Mozai and Minoru Kobayashi FIG. 5 is a cross-sectional view illustrating a general configuration of a gyrocompass having a center pin. Reference numeral 1 denotes a computation and follow-up control unit which is a portion which controls the power supply of the apparatus and various arithmetic operations and is in charge of follow-up control for maintaining the relative angle between a gyrosphere and a liquid tank by detecting the position of the gyrosphere. The computation and follow-up control unit 1 mainly consists of a gear mechanism for follow-up and printed board circuits.

Reference numeral 2 denotes a vibration proofing mechanism for maintaining a liquid tank unit substantially horizontally by inclination like a pendulum and for absorbing the vibrations of a ship in the longitudinal and transverse directions of the ship when the ship has rocked.

Reference numeral 3 denotes a liquid tank unit which is suspended in the vibration proofing mechanism 2. In the liquid tank unit 3, a liquid tank 4 has a gyrosphere 5 and an electrolyte (supporting liquid) 6 incorporated therein. The gyrosphere 5 has a gyro rotor 7 incorporated therein, and floats in the liquid tank 4 by means of the supporting tank 6, and its central portion is rotatably supported by a center pin 8 provided in an upper portion of the liquid tank.

FIG. 6 is a perspective view illustrating a feeding structure for the gyrosphere 5. Two dish-shaped electrodes 9, which are disposed in close proximity to and in face-to-face relation to each other through the supporting liquid 6, are respectively formed at a lower portion of the liquid tank 4 and a lower portion of the gyrosphere 5. Electric power is fed from an external power supply 10 to the gyro rotor 7 incorporated in the gyrosphere 5 through the center pin 8 and the dish-shaped electrodes 9. It should be noted that the surface of the gyrosphere other than the electrode is insulated.

FIG. 7 is a cross-sectional view illustrating the details of the feeding structure through the center pin. The tip of the center pin 8 is tapered, and this tip and a jewel bearing 11 provided on the gyrosphere side form a pivot, which allows the gyrosphere 5 floating in the supporting liquid 6 to be supported rotatably vertically and horizontally. Meanwhile, a small amount of mercury 14 is filled in a gap between a tip metal portion 8a of the center pin and a pot-like metal portion 13 conducting with a terminal 12 on the gyrosphere side, thereby forming one feeding circuit from the center pin 8 to the gyrosphere 5. Reference numeral 15 denotes insulating oil such as Demnum (trade name; product of Daikin Industries, Ltd.) for insulating the mercury 14 and the supporting liquid 6, and numeral 16 denotes an O-ring for sealing the entry of the supporting liquid into the gyrosphere.

The gyro rotor 7 is connected to the one feeding circuit through the center pin 8 and the other feeding circuit for allowing an electric current to flow through the supporting liquid 6 by the dish-shaped electrodes 9 respectively formed at the lower portion of the liquid tank 4 and the lower portion of the gyrosphere 5 in face-to-face relation to each other, and the gyro rotor 7 rotates at high speed inside the gyrosphere.

FIG. 8 is a diagram explaining a deviation detecting mechanism in the follow-up control for causing the liquid tank 4 to follow up the gyration of the gyrosphere 5. A pair of (two) follow-up electrodes 17a and 17b are provided on an inner wall of the liquid tank 4 at positions opposing an equatorial portion of the gyrosphere 5 and spaced apart from each other by 180°. A belt-shaped electrode 18, which is slightly shorter than 180° (2° each at both ends), is formed at the equatorial portion of the gyrosphere 5, and a difference in resistance between supporting liquid resistors Ra and Rb between both ends 18a and 18b of the belt-shaped electrode 18 and the follow-up electrodes 17a and 17b is detected by a Wheatstone bridge.

The belt-shaped electrode 18 is connected to the dish-shaped electrode 9 at the lower portion of the gyrosphere and is set at the same potential, and is connected to one terminal of the external power supply 10 through the dish-shaped electrode 9. The gyro rotor 7 is connected between this dish-shaped electrode 9 and the tip metal 8a of the center pin 8, and electricity is fed thereto.

The follow-up electrodes 17a and 17b are connected to both ends of a primary winding of a transformer 19 for forming a Wheatstone bridge, and a midpoint of the primary winding is connected to one terminal of the external power supply 10 via a resistor 20 for current regulation. In a steady state, Ra=Rb, and the Wheatstone bridge is balanced and the induced voltage to a secondary winding of the transformer 19 is zero.

When the gyrosphere 5 gyrates in the direction of arrow P, and the relative angular relationship with the liquid tank 4 is offset about the vertical axis, Ra≠Rb, and a deviation (error voltage) in consequence of the imbalance of the Wheatstone bridge is induced in the secondary winding of the transformer 19, so that a deviation signal E is obtained through an amplifier 21. The amplitude of this deviation signal E represents a deviation angle, and the phase the gyrating direction.

The follow-up control unit 1 has the follow-up function whereby the gear mechanism is driven on the basis of this deviation signal E to simultaneously rotate the vibration proofing mechanism 2 and the liquid tank unit 3 in the direction of Q about the vertical axis, thereby correcting the relative angular relationship between the gyrosphere 5 and the liquid tank 4 such that the Wheatstone bridge becomes balanced.

The supporting liquid 6 is an electrolyte whose major agent is benzoic acid. Further, the specific gravity of the supporting liquid 6 has been adjusted by dynamite glycerin so that the gyrosphere 5 is always set in a floating state with respect to the ambient temperature.

The gyrocompass having the above-described conventional structure has the following problems.
(1) Mercury is used in a feeding route through the center pin, and it is desirable not to use mercury in the light of the protection of the global environment.
(2) If mercury is used in the electrolyte, ions are adsorbed on the center pin surface, the mercury surface, and the pot-like metal portion of the gyrosphere due to the electro-capillarity phenomena, and the intermolecular force of ions acts as a restraining force and hampers the "frictionless free rotation of the gyrosphere," exerting an adverse effect on the accuracy. As a measure, this problem can be solved by interposing the insulating oil 15 such as Demnum (tetrafluoroethylene) or the like between the mercury 14 and the supporting liquid 6, as explained with reference to FIG. 7, but this insulating oil is not friendly to the global environment, either.

SUMMARY OF THE INVENTION

The object of the invention is to provide a gyrocompass which is capable of feeding electricity to a gyro rotor without using a harmful substance in the feeding route into a gyrosphere and realizing follow-up accuracy equivalent to conventional one.

The invention provides a gyrocompass having: a liquid tank which contains a supporting liquid therein; a gyrosphere which floats in the liquid tank by means of the supporting liquid and whose central portion is rotatably supported by a center pin provided in an upper portion of the liquid tank; a gyro rotor incorporated in the gyrosphere; two dish-shaped electrodes respectively disposed at a lower portion of the liquid tank and a lower portion of the gyrosphere, and opposed through the supporting liquid; and a pair of follow-up electrodes respectively disposed in a vicinity of a equator of the liquid tank and opposed to be apart each other by 180°; and two belt-shaped electrodes respectively disposed in vicinities of equators of the liquid tank and the gyrosphere in a state that the follow-up electrodes are located therebetween, and opposed through the supporting liquid, wherein electricity is fed to the gyro rotor through the dish-shaped electrodes and the belt-shaped electrodes.

The gyrocompass further has a Wheatstone bridge circuit provided with: a transformer; the pair of follow-up electrodes respectively connected to both ends of a primary winding of the transformer; supporting liquid resistances respectively provided between one end of the belt-shaped electrode on a gyrosphere side and one of the pair of follow-up electrodes and between another end of the belt-shaped electrode on the gyrosphere side and another of the pair of follow-up electrodes, and whose resistance changes according to rotation of the gyrosphere; and an AC power supply provided between the belt-shaped electrode on a liquid tank side and a midpoint of the primary winding of the transformer, wherein a deviation signal induced in a secondary winding of the transformer changes according to a change in the resistance of the supporting liquid resistances.

The gyrocompass further has a Wheatstone bridge circuit provided with: the belt-shaped electrode on a gyrosphere side; the pair of follow-up electrodes; a resistance provided between the pair of follow-up electrodes; supporting liquid resistances respectively provided between one end of the belt-shaped electrode on a gyrosphere side and one of the pair of follow-up electrodes and between another end of the belt-shaped electrode on the gyrosphere side and another of the pair of follow-up electrodes, and whose resistance changes according to rotation of the gyrosphere; and an AC power supply provided between the belt-shaped electrode on a liquid tank side and a midpoint of the resistance, wherein a voltage between the pair of follow-up electrodes changes according to a change in the resistance of the supporting liquid resistances.

According to the gyrocompass, since electricity can be fed to the gyro rotor without using harmful substances such as mercury and special insulating oil or the like in the feeding route into the gyrosphere, it is possible to provide a product which is friendly to the global environment.

Further, since the Wheatstone bridge circuit can be mounted in the same way as in the conventional case, a product which ensures follow-up accuracy equivalent to conventional one can be provided without increasing the cost.

BRIEF DESCRIPTION OF THE DRAWINGS

FIG. 8 is a diagram explaining a deviation detecting mechanism in the follow-up control for causing the liquid tank to follow up the gyration of the gyrosphere.

DETAILED DESCRIPTION OF THE PREFERRED EMBODIMENTS

Figure 1:
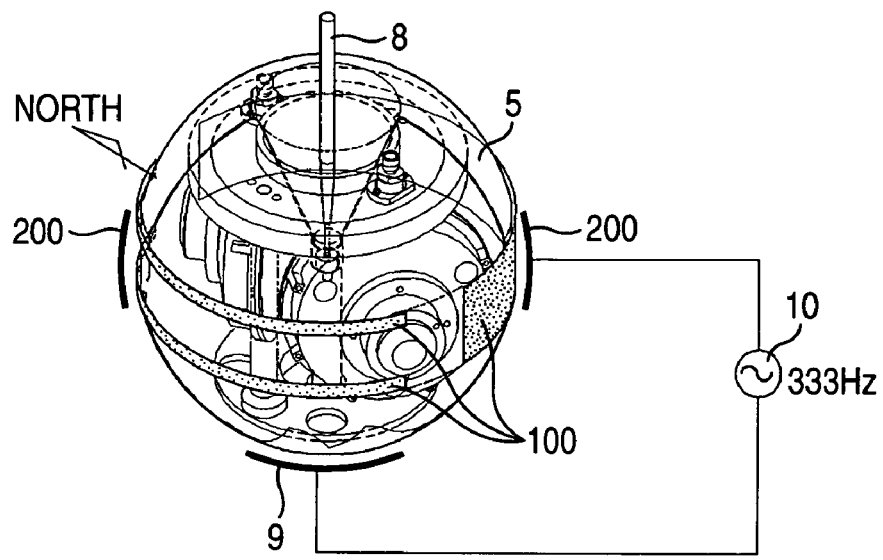
FIG. 1 is a perspective view illustrating an embodiment of a gyrocompass to which the invention is applied, an explains a feeding structure for a gyrosphere.

Embodiments of the invention are described with reference to the drawings. FIG. 1 is a perspective view illustrating an embodiment of a gyrocompass to which the invention is applied, and explains a feeding structure for a gyrosphere 5. Elements identical to those of the conventional gyrocompass described with reference to FIGS. 5 to 8 will be denoted by the same reference numerals, and a description thereof will be omitted. Hereafter, a description will be given of the characteristic portions of the invention.

In the conventional art (FIGS. 6 and 7), the structure provided is such that a center pin 8 supports a gyrosphere 5, electricity is fed to a gyro rotor by mercury disposed at a tip of this center pin and the dish-shaped electrode in the lower portion, and separate follow-up electrodes are provided.

In the embodiment, the center pin 8 solely functions to only support the gyrosphere 5. A belt-shaped electrode 200 on the gyrosphere side disposed through the supporting liquid in face-to-face relation to a belt-shaped electrode 100 provided on an outer periphery in the vicinity of the equator of the gyrosphere 5 is caused to function as one feeding route of an external power supply 10. The other feeding route of the external power supply 10 is the same as the conventional one, and two dish-shaped electrodes 9 respectively disposed at lower portions of the gyrosphere and the liquid tank in face-to-face relation to each other are used.

In cooperation with a pair of follow-up electrodes on a liquid tank side (not shown in FIG. 1), the belt-shaped electrode 100 on the gyrosphere side forms a Wheatstone bridge circuit, and the structure of serving as both the electrode for feeding and the electrode for follow-up control constitutes the characteristic of the invention. By virtue of this structure, harmful substances such as mercury and insulating oil provided at the tip portion of the conventional center pin become unnecessary.

Figure 2:
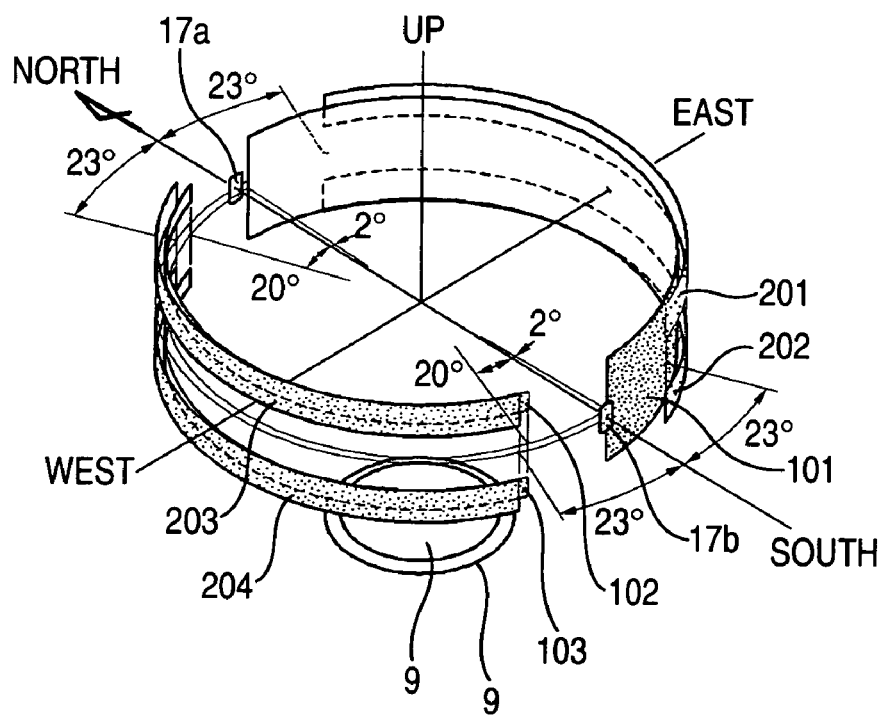
FIG. 2 is a perspective view illustrating as a set the electrodes on the gyrosphere side and the electrodes on the liquid tank side concerning the electrode structure of the gyrocompass in accordance with the invention.

FIG. 2 is a perspective view illustrating as a set the electrodes on the gyrosphere 5 side and the electrodes on the liquid tank 4 side concerning the electrode structure of the gyrocompass in accordance with the invention. Numerical values of angles given in the drawing are given by way of example. Since the respective electrodes are given new appellations, they will be described below.

The belt-shaped electrode 100 on the gyrosphere 5 side consists of one central belt-shaped electrode 101 and a pair of two-rowed electrodes 102 and 103. The central belt-shaped electrode 101 is disposed in the vicinity of the equator on the side surface of the gyrosphere with a predetermined width in the latitudinal direction and with a length extending slightly less than about half around the gyrosphere (its end point being 2° short in terms of the angle in the drawing) between the positions of follow-up electrodes 17*a* and 17*b* on the liquid tank side.

The two-rowed electrodes 102 and 103 are formed on an outer peripheral surface opposite to the central belt-shaped electrode 101 in such a manner as to be spaced apart a predetermined distance with the equator located therebetween on the side surface of the gyrosphere and with a length extending slightly less than about half around the gyrosphere (their end points being 20° short in terms of the angle in the drawing).

The belt-shaped electrode 200 on the inner wall surface of the liquid tank consists of a total of four two-rowed electrodes including a pair of two-rowed electrodes 201 and 202 and a pair of two-rowed electrodes 203 and 204. The two-rowed electrodes 201 and 202 are disposed on the inner wall surface of the liquid tank in such a manner as to be arranged in face-to-face relation to the central belt-shaped electrode 101 on the gyrosphere side while keeping a predetermined distance therebetween in the latitudinal direction and with a length extending slightly less than about half around the inner wall of the liquid tank (their end points being 23° short in terms of the angle in the drawing).

The two-rowed electrodes 203 and 204 are formed on the inner wall surface of the liquid tank opposite to the two-rowed electrodes 201 and 202, have a length extending slightly less than about half around the inner wall of the liquid tank (their end points being 23° short in terms of the angle in the drawing), and are arranged in close proximity to and in face-to-face relation to the two-rowed electrodes 102 and 103 on the gyrosphere side through the supporting liquid.

The dish-shaped electrode 10 is formed at the lower portion of the liquid tank 4 and the lower portion of the gyrosphere 5, and is disposed at a position where it is located in close proximity and in face-to-face relation thereto through the a supporting liquid 6.

By virtue of the above-described electrode structure, the mutually opposing belt-shaped electrodes (the central belt-shaped electrode 101 on the gyrosphere and the two-rowed electrodes 201 and 202 on the liquid tank) are capable of assuming large areas in the vicinity of the equator, and are therefore capable of feeding a sufficient current for driving a gyro rotor 7 if the supporting liquid (electrolyte) is present in the gap.

In addition, since supporting liquid resistors Ra and Rb between both ends of the central belt-shaped electrode 101 and the follow-up electrodes 17*a* and 17*b* on the liquid tank side are formed into a Wheatstone bridge, follow-up control of the liquid tank with respect to the gyration of the gyrosphere becomes possible as in the conventional case.

Figure 3:
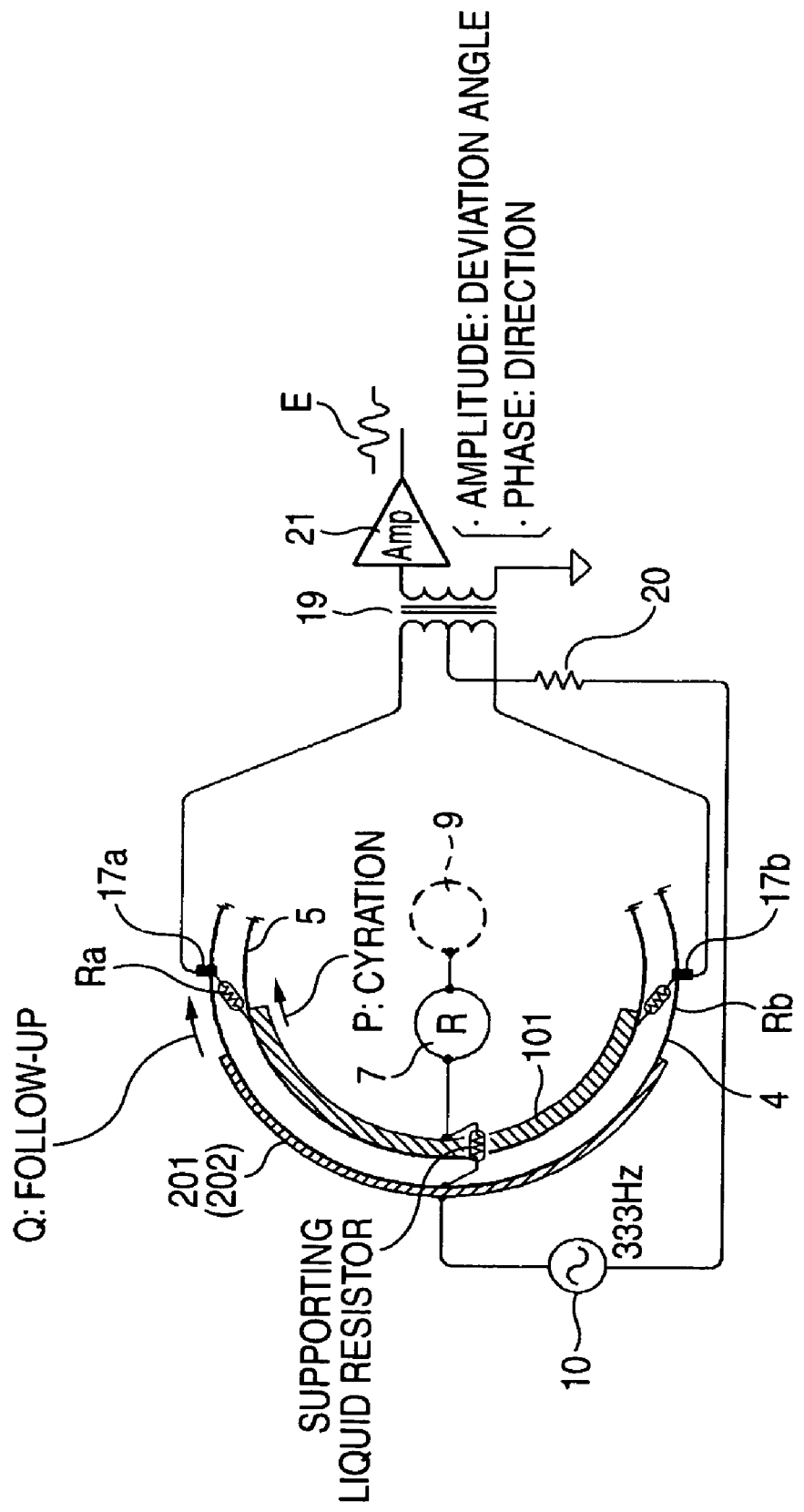
FIG. 3 is a circuit diagram illustrating an example of a deviation detecting mechanism which is applicable to the electrode structure of the invention in the follow-up control for causing the liquid tank to follow up the gyration of the gyrosphere.

FIG. 3 is a circuit diagram illustrating an example of a deviation detecting mechanism which is applicable to the electrode structure of the invention in the follow-up control for causing the liquid tank 4 to follow up the gyration of the gyrosphere 5. The circuit in which the follow-up electrodes 17*a* and 17*b* are connected to both ends of a primary winding of a transformer 19 is similar to the conventional circuit shown in FIG. 8, but differs in that one side of the external power supply 10 is not a dish-shaped electrode as in the conventional circuit but is connected to the two-rowed electrodes 201 and 202 on the liquid tank side.

In FIG. 3, the arrangement of the respective electrodes corresponds to a case in which a cross-sectional view of the liquid tank unit is viewed from above. The two-rowed electrodes 201 and 202 on the liquid tank side and the central belt-shaped electrode 101 on the gyrosphere side are opposed to each other with a relatively large area, and the electrolyte resistance therebetween is either small or of such a magnitude as to be negligible in the operation of the follow-up circuit.

In addition, the two-rowed electrodes 201 and 202 have a smaller spread (angle) than the central belt-shaped electrode 101. The supporting liquid resistors Ra and Rb which are present between the ends of the central belt-shaped electrode 101 and the follow-up electrodes 17*a* and 17*b* on the liquid tank side function as bridge resistors and form a complete Wheatstone bridge together with the transformer having a center tap in the drawing.

In the above-described configuration, in a case where the gyrosphere 5 has gyrated (rotated) in the direction of arrow P, one follow-up electrode 17*a* and one end of the central belt-shaped electrode 101 approach each other, while the other follow-up electrode 17*b* and the other end of the central belt-shaped electrode 101 move away from each other. Therefore, the supporting liquid resistors Ra and Rb which are present in the gap mutually change differentially, so that the Wheatstone bridge is set in a state of imbalance.

As for a deviation signal E obtained by amplifying the signal from the Wheatstone bridge induced in a secondary winding of the transformer 19 as a result of this imbalance, its amplitude serves as a deviation angle, and its phase indicates the direction of gyration. It should be noted that the belt-shaped electrodes on the gyrosphere side are provided with different shapes concerning the central belt-shaped electrode 101 and the two-rowed electrodes 102 and 103 is in consideration of ensuring that the follow-up point will not be formed at a 180° inverted point.

Figure 4:
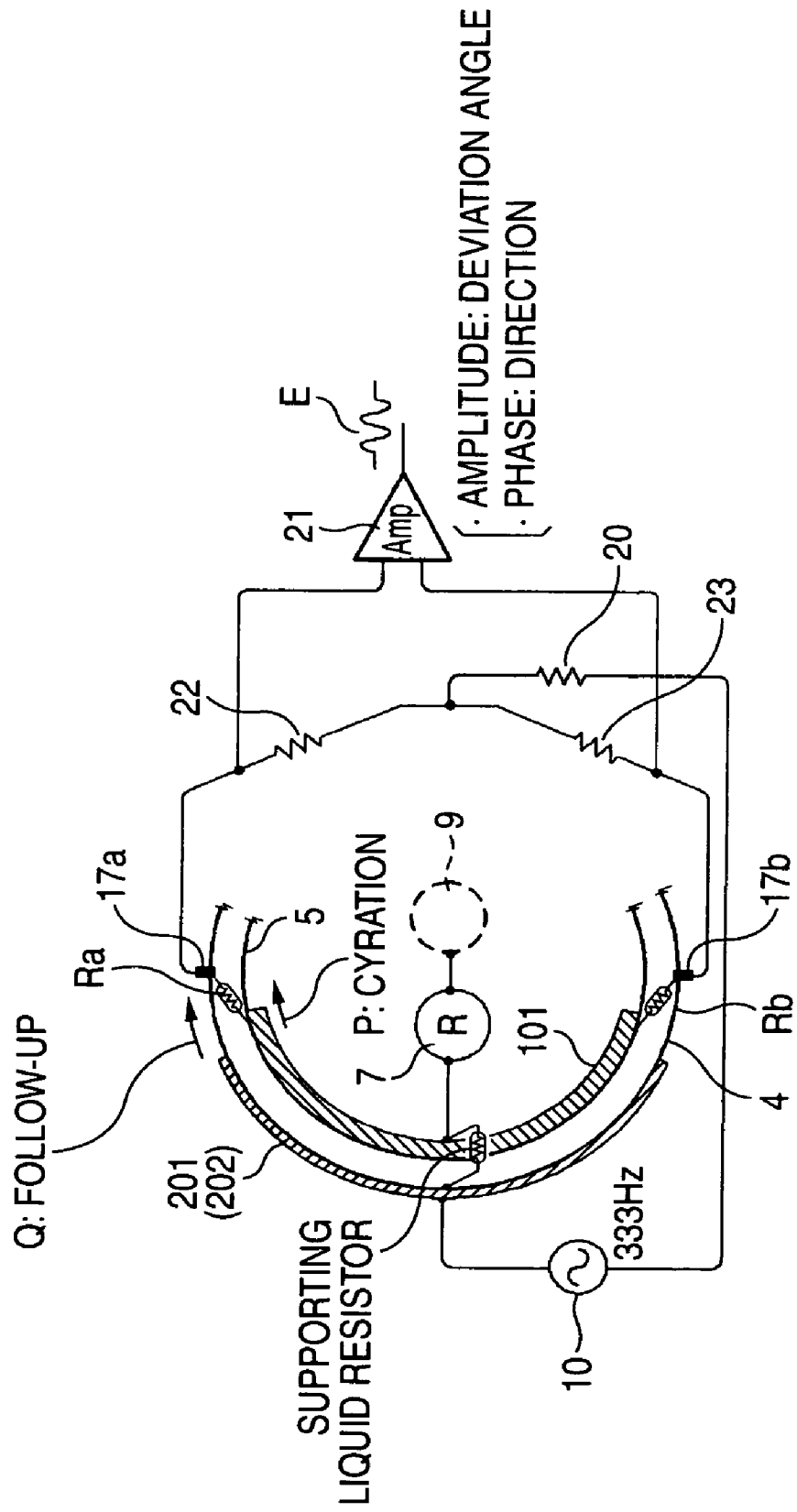
FIG. 4 is a circuit diagram illustrating another example of the deviation detecting mechanism which is applicable to the electrode structure of the invention.
Figure 5:
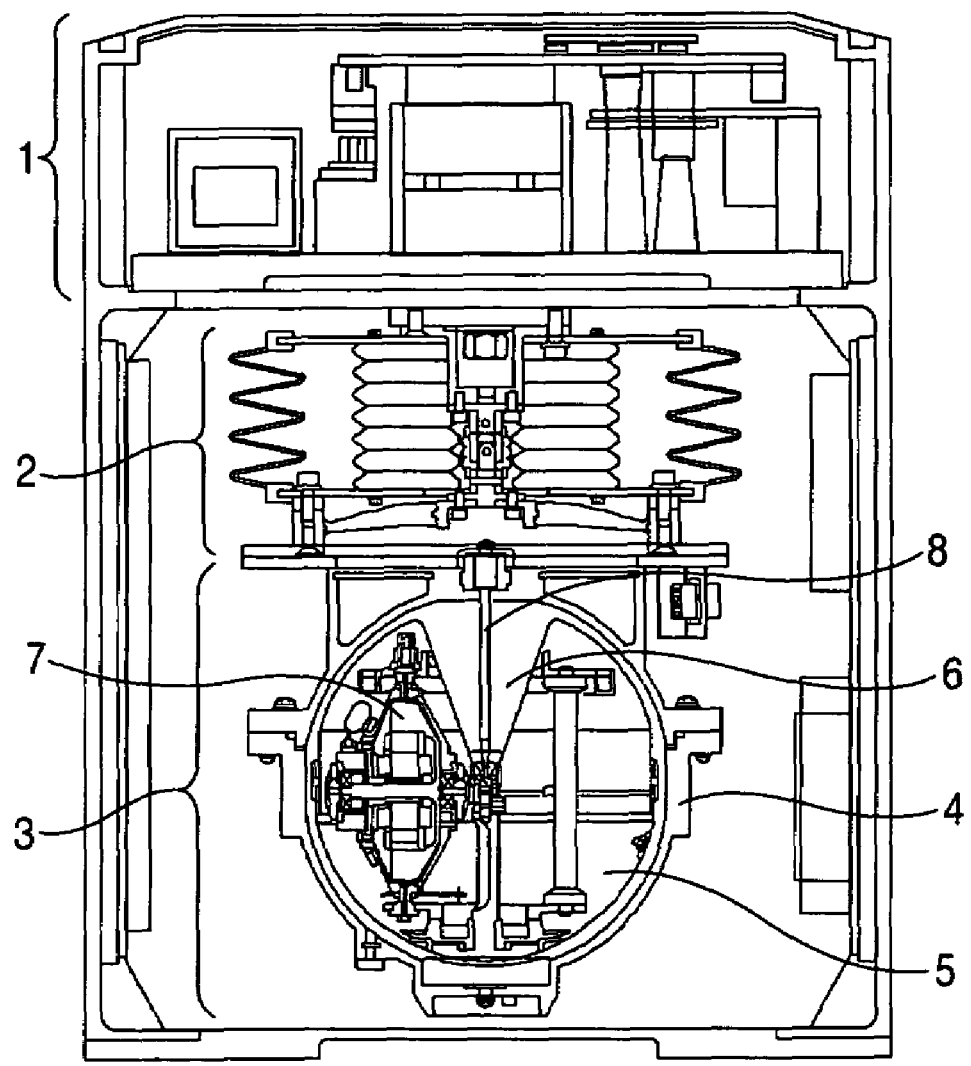
FIG. 5 is a cross-sectional view illustrating a general configuration of the gyrocompass.
Figure 6:
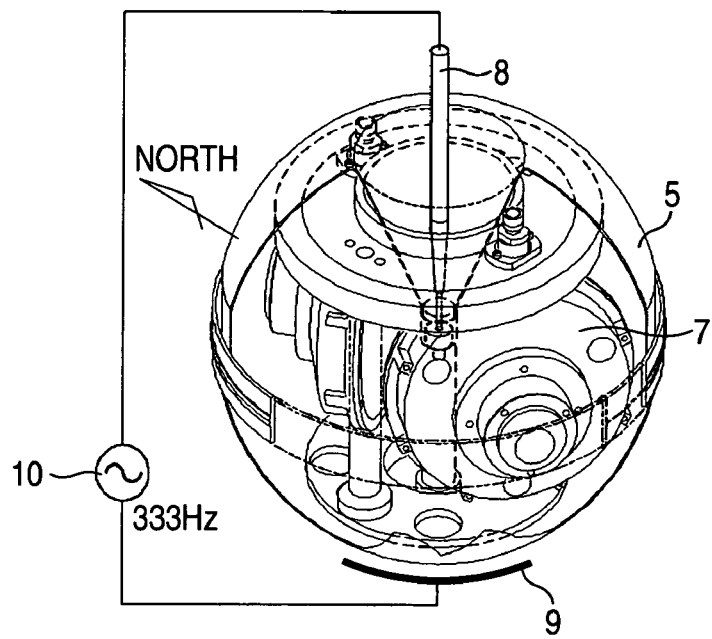
FIG. 6 is a perspective view illustrating a feeding structure for the gyrosphere in a conventional structure.
Figure 7:
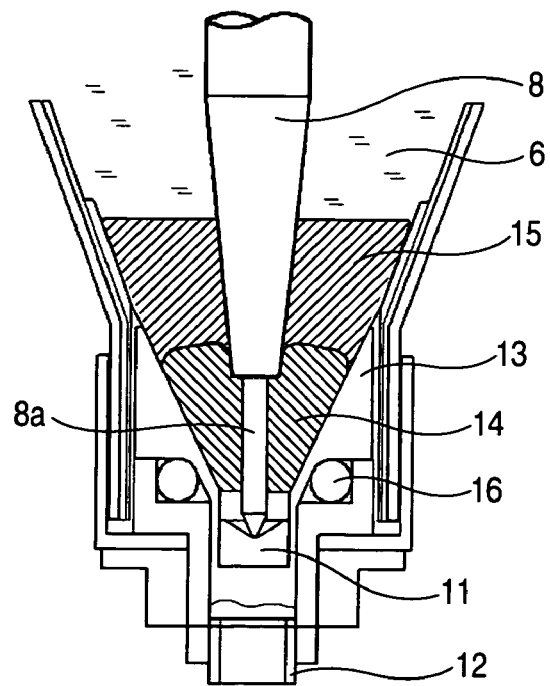
FIG. 7 is a cross-sectional view illustrating the details of the feeding structure through a center pin in the conventional structure.

FIG. 4 is a circuit diagram illustrating another example of the deviation detecting mechanism which is applicable to the electrode structure of the invention in the follow-up control for causing the liquid tank 4 to follow up the gyration of the gyrosphere 5. In this example, instead of the transformer 19 for forming the Wheatstone bridge, a series circuit of resistors 22 and 23 whose values are equal is connected between the follow-up electrodes 17a and 17b, the other terminal of the external power supply 10 is connected to a point of connection of the resistors, and an unbalanced voltage of the bridge occurring between the follow-up electrodes 17a and 17b is led to an amplifier 21 to obtain the deviation signal E.

The reason two pairs of two-rowed electrodes, i.e., a total of four electrodes, are used on the liquid tank side is to symmetrically surround the peripheries of the follow-up electrodes 17a and 17b with the same potential so as to convert the noise due to the supply current straying in the supporting liquid into common-mode noise, thereby enhancing the follow-up sensitivity.

The follow-up technique based on the Wheatstone bridge using the follow-up electrodes and the belt-shaped electrodes used conventionally and described in the embodiment is a known technique which has been in use for a long time. The gyrocompass in the embodiment is friendly to the earth by eliminating harmful substances by allowing the belt-shaped electrodes to also serve as the feeding path for the gyro rotor, in addition to the use of the known technique of the above-described belt-shaped electrodes.

What is claimed is:

1. A gyrocompass comprising:
   a liquid tank which contains a supporting liquid therein;
   a gyrosphere which floats in the liquid tank by means of the supporting liquid and whose central portion is rotatably supported by a center pin provided in an upper portion of the liquid tank;
   a gyro rotor incorporated in the gyrosphere;
   two dish-shaped electrodes respectively disposed at a lower portion of the liquid tank and a lower portion of the gyrosphere, and opposed through the supporting liquid; and
   a pair of follow-up electrodes respectively disposed in a vicinity of a equator of the liquid tank and opposed to be apart each other by 180°; and
   two belt-shaped electrodes respectively disposed in vicinities of equators of the liquid tank and the gyrosphere in a state that the follow-up electrodes are located therebetween, and opposed through the supporting liquid,
   wherein electricity is fed to the gyro rotor through the dish-shaped electrodes and the belt-shaped electrodes.

2. The gyrocompass according to claim 1, further comprising a Wheatstone bridge circuit provided with:
   a transformer;
   the pair of follow-up electrodes respectively connected to both ends of a primary winding of the transformer;
   supporting liquid resistances respectively provided between one end of the belt-shaped electrode on a gyrosphere side and one of the pair of follow-up electrodes and between another end of the belt-shaped electrode on the gyrosphere side and another of the pair of follow-up electrodes, and whose resistance changes according to rotation of the gyrosphere; and
   an AC power supply provided between the belt-shaped electrode on a liquid tank side and a midpoint of the primary winding of the transformer,
   wherein a deviation signal induced in a secondary winding of the transformer changes according to a change in the resistance of the supporting liquid resistances.

3. The gyrocompass according to claim 1, further comprising a Wheatstone bridge circuit provided with:
   the belt-shaped electrode on a gyrosphere side;
   the pair of follow-up electrodes;
   a resistance provided between the pair of follow-up electrodes;
   supporting liquid resistances respectively provided between one end of the belt-shaped electrode on a gyrosphere side and one of the pair of follow-up electrodes and between another end of the belt-shaped electrode on the gyrosphere side and another of the pair of follow-up electrodes, and whose resistance changes according to rotation of the gyrosphere; and
   an AC power supply provided between the belt-shaped electrode on a liquid tank side and a midpoint of the resistance,
   wherein a voltage between the pair of follow-up electrodes changes according to a change in the resistance of the supporting liquid resistances.

4. The gyrocompass according to claim 1, wherein the first belt-shaped electrode comprises one central belt shaped electrode and a pair of two rowed electrodes, said central belt shaped electrode being disposed in the vicinity of the equator on the side surface of the gyrosphere with a predetermined width in the latitudinal direction and with a length extending slightly less that about half around the gyrosphere.

5. The gyrocompass according to claim 4 wherein said two-rowed electrodes are formed on an outer peripheral surface opposite to the central belt shaped electrode and are spaced apart a predetermined distance with the equator located there between on the side surface of the gyrosphere and with a length extending slightly less than about half around the gyrosphere.

6. The gyrocompass according to claim 1 wherein the belt shaped electrode on the inner wall surface comprises:
   a first pair of two rowed electrodes disposed on the inner wall of the liquid tank in face to face relation to the central belt shaped electrode on the gyrosphere side while keeping a predetermined distance there between in the latitudinal directions with a length extending slightly less than about half around the inner wall of the liquid tank, and
   a second pair of two rowed electrodes disposed on the inner wall surface of the liquid tank opposite the first two rowed electrode pair and having a length extending slightly less than about half around the inner wall for the liquid tank.

* * * * *